Figure 1:
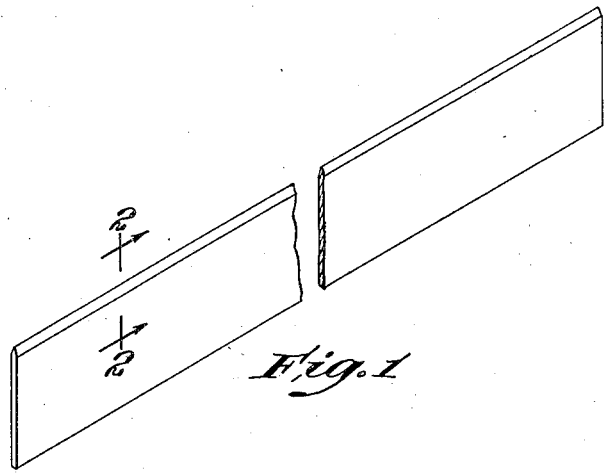

Oct. 24, 1944.       G. E. HARDY, JR       2,361,288
CUTTING RULE
Filed April 17, 1944

Inventor
George E. Hardy Jr.
by Roberts, Cushman & Grover
att'ys.

Patented Oct. 24, 1944

2,361,288

UNITED STATES PATENT OFFICE 2,361,288

CUTTING RULE

George E. Hardy, Jr., Fitchburg, Mass., assignor to Simonds Saw and Steel Company, Fitchburg, Mass., a corporation of Massachusetts Application April 17, 1944, Serial No. 531,516

4 Claims. (Cl. 164—18)

This invention relates to steel cutting rules of the type used in cutting, scoring, creasing and perforating paper, cardboard, leather, felt, cork, etc., for making boxes, cartons, novelties and the like, the rules being thin and flexible so that they can be bent into various shapes. After the rules are shaped they are clamped between blocks to form a so-called die from which the cutting edges project in approximately the same plane for engagement with the stock to be cut or scored. Sometimes the stock is disposed on a drum for rolling engagement with the cutting edges and in other cases it is mounted on a flat surface for simultaneous engagement with all the cutting edges.

Heretofore considerable difficulty has resulted from the cutting edges getting dented or turned in handling the rules and in setting up the die. For example if any of the edges project too far they are likely to be turned sidewise in the first operation of testing the die. When thus turned the cutting edges do not cut well until the turned tips of the edges have worn off. Moreover the turned edges wear unevenly on opposite sides so that, as the edges wear back, they tend to shift laterally from the medians of the rules, thereby producing an undesirable variation in the dimensions of the box or other article made from the cut blank.

Inasmuch as the usual die involves a considerable number of lines and corners it takes as much time to set up the die as it does to cut many sheets of stock after the die is completed. Consequently it is desirable to make the cutting edges last as long as possible before they have to be removed for replacement.

Objects of the present invention are to provide a cutting rule which is free from the aforesaid difficulties, which is not easily damaged in handling or in preparing the die, which has long life, which retains its cutting edge centered on the rule throughout its life and which makes substantially the same kind of cut throughout its entire life.

According to the present invention the rule is characterized in that the degree of taper increases toward the cutting edge throughout the beveled margin of the rule and the cutting edge is rounded. While the increase of taper may be gradual it is preferably formed in successive stages, the degree of taper being substantially constant throughout each stage. By increasing the degree of taper toward the cutting edge the rules do not have to be replaced so often, thereby not only increasing the life of the rules but greatly reducing the number of time-consuming operations of setting up the die. Moreover they maintain approximately the same degree of bevel as they wear back instead of the bevel gradually increasing near the cutting edge as it does in the ordinary rule having the same degree of taper throughout the entire width of its beveled margin. The rounding of the cutting edge is preferably on an arc which is tangent to the beveled sides in the next preceding stage. By thus rounding the edges on a small radius, the edges are not easily damaged in handling the rules or in preparing the die and I find that they cut just as well or better; and by thus preventing the edges from being turned they do not tend to wear unevenly on opposite sides and therefore do not tend to shift off center as they wear back.

Figure 2:
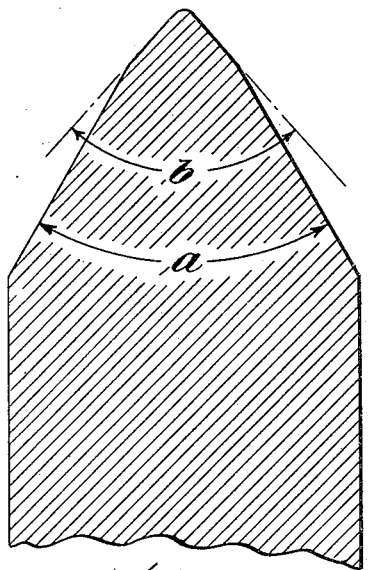

For the purpose of illustration a typical embodiment of the invention is shown in the accompanying drawing in which Fig. 1 is a perspective view of one of the rules; and Fig. 2 is a section on line 2—2 of Fig. 1.

In the particular embodiment of the invention chosen for the purpose of illustration the margin of the rule is beveled in two stages, the angle subtended between opposite sides of the first stage being indicated by $a$ and the angle subtended between the opposite sides of the second stage being indicated by $b$. For best results these angles should be approximately 60° and 85° respectively. The radius of curvature of the cutting edge may be as low as one-thousandth of an inch and should never exceed a few thousandths. The length of the first stage should be much greater than that of the second stage, the ratio preferably being approximately 3 to 1 as shown in Fig. 2. In this way shoulders are provided well up on the bevel near the cutting edge where most of the wear takes place due to the abrasive action of the stock on the beveled sides. By thus shaping the beveled edge, the life of the rule is not only greatly increased but the cross-sectional shape of the beveled edge is maintained approximately constant throughout the life of the rule. That is as the edge wears back the wear is distributed fairly uniformly throughout the second stage so that the angle $b$ remains approximately constant notwithstanding the location of the shoulders moves backwards as the tip wears away. Thus after making one-half million cuts it has been found that the angles $a$ and $b$ of the first and second stages remain substantially unchanged, even though the length of the beveled sides of the first stage has decreased and the length of the sides of the second stage has increased due to the substantially uniform wear throughout the second stage. This is in marked contrast with the ordinary rule which has the same degree of taper throughout the entire width of its beveled margin and which changes in shape as the tip end of the beveled margin wears back, developing shoulders near the cutting edge with a higher degree of taper between the shoulders and the cutting edge.

By shaping the cutting edges of rules according to the present invention the life of the rules is increased 20% to 50%. This not only reduces the expense of the rules themselves, but it also effects a large saving by reducing the number of times the die has to be set up in turning out a large number of blanks. Furthermore the rules make cleaner cuts so as not to leave feather edges which have to be brushed off to avoid clogging the packaging machines or other machines in which the blanks are subsequently used.

It should be understood that the present disclosure is for the purpose of illustration only and that this invention includes all modifications and equivalents which fall within the scope of the appended claims.

I claim:

1. A cutting rule of the thin flexible type comprising a ribbon of steel a few hundredths of an inch thick having one margin tapered to a cutting edge, the degree of taper increasing toward the cutting edge throughout the tapered margin and the cutting edge being rounded approximately on an arc which is tangent to the tapered margin.

2. A cutting rule of the thin flexible type comprising a ribbon of steel a few hundredths of an inch thick having one margin beveled on both sides in successive stages to form a cutting edge, the angle subtended between opposite sides increasing from stage to stage toward the cutting edge and the cutting edge being rounded approximately on an arc which is tangent to the beveled sides in the next preceding stage.

3. A cutting rule of the thin flexible type comprising a ribbon of steel a few hundredths of an inch thick having one margin tapered to a cutting edge, the degree of taper starting at approximately 60° and increasing toward the cutting edge throughout the tapered margin and the cutting edge being rounded approximately on an arc which is tangent to the tapered margin.

4. A cutting rule of the thin flexible type comprising a ribbon of steel a few hundredths of an inch thick having one margin beveled on both sides in successive stages to form a cutting edge, the angle subtended between opposite sides increasing from stage to stage toward the cutting edge and the cutting edge being rounded approximately on an arc which is tangent to the beveled sides in the next preceding stage, the angle in the stage remote from the cutting edge approximating 60° and the angle in the stage adjacent the cutting edge approximating 85°.

GEORGE E. HARDY, Jr.